United States Patent
Herron

[15] 3,671,787

[45] June 20, 1972

[54] LAMINATED DYNAMOELECTRIC MACHINE HAVING NONMAGNETIC LAMINA FOR STRUCTURAL SUPPORT

[72] Inventor: Christopher C. Herron, Boulder, Colo.

[73] Assignee: International Business Machines Corporation, Armonk, N.Y.

[22] Filed: Aug. 16, 1971

[21] Appl. No.: 171,821

[52] U.S. Cl................................310/154, 310/218, 310/254
[51] Int. Cl..........................................................H02k 21/26
[58] Field of Search..............................310/154, 216–218, 310/254, 258, 181, 64, 65

[56] References Cited

UNITED STATES PATENTS

| | | | |
|---|---|---|---|
| 1,080,611 | 12/1913 | Wait | 310/64 |
| 2,193,406 | 3/1940 | Goss et al. | 310/154 |
| 2,298,652 | 10/1942 | Schwarzmann et al. | 310/154 |
| 2,323,114 | 6/1943 | Bradford et al. | 310/218 |
| 2,479,455 | 8/1949 | Aronoff | 310/154 |
| 2,877,366 | 3/1959 | Carr | 310/156 |
| 2,993,134 | 7/1961 | Harvey | 310/218 X |
| 3,010,041 | 11/1961 | Miller | 310/254 X |

Primary Examiner—D. F. Duggan
Attorney—Francis A. Sirr et al.

[57] ABSTRACT

A permanent magnet dynamoelectric machine whose housing is formed by a plurality of continuous nonmagnetic lamina which support a plurality of discontinuous magnetic lamina in cooperative relation to permanent magnets. The nonmagnetic lamina structurally defines the machine housing and includes lamina cavities to hold the magnets. The nonmagnetic lamina includes other lamina portions which mount the discontinuous magnetic lamina in cooperative relation to the magnets to define the magnetic flux path and the working air gap.

14 Claims, 5 Drawing Figures

PATENTED JUN 20 1972  3,671,787

LAMINATED DYNAMOELECTRIC MACHINE HAVING NONMAGNETIC LAMINA FOR STRUCTURAL SUPPORT

BACKGROUND AND SUMMARY OF THE INVENTION

The present invention relates to the field of electrical generator or motor structure, particularly to a dynamoelectric machine having permanent magnets, and more particularly having a laminated stator with permanent magnets.

Permanent magnet dynamoelectric machines are known which utilize focusing magnetic-metal pole pieces which structurally define a working air gap and are associated one to a magnet to focus the magnetic flux to the working air gap. Also, associated with the magnets are magnetic-metal flux-interconnection members which provide a low reluctance path for the magnetic flux to complete its travel outside the air gap. This prior art provides both solid and laminated pole pieces and flux-interconnecting members. The pole pieces, magnets and flux-interconnecting members are structurally joined to form an operative unit. This has been done by various means, including the cementing of the parts one to another.

The present invention improves machines of this general type by simplifying the construction by which the required magnetic-metal members are structurally associated with the magnets, and the construction by which the magnets are mechanically held in place. Specifically, the structure of the present invention is composed of layers of magnetic-metal lamina (magnetically conductive), for example low-carbon steel, and nonmagnetic-metal lamina, for example aluminum. The steel lamina may be of greater thickness than the aluminum lamina and provides the magnetic flux conduction path which is necessary to focus the flux to the working air gap and to conduct the flux through a low reluctance path outside the air gap. The aluminum lamina may be relatively thin, and provides structural integrity for the machine by holding the magnets and the magnetic-metal lamina in cooperative magnetic relation.

More specifically, the aluminum lamina is continuous and is constructed and arranged to perform two primary functions. The first function is that of mounting the magnets. This function is achieved by lamina cavities which receive and hold the magnets. The second function is that of mounting the discontinuous magnetic-metal lamina relative to the magnets, to provide the necessary air gap and low reluctance flux path. Each layer of magnetic-metal lamina is discontinuous and includes a focusing portion which is held adjacent to one magnet pole, and a second flux-interconnecting portion which is held adjacent to the other magnet pole. This flux-interconnecting portion forms a low reluctance path for the flux as it flows between two adjacent magnets, which form a magnetic couple, outside the air gap. Thus, the volume or quantity of magnetic-metal is dictated only by the magnetic flux carrying requirements, since this metal is not necessarily used for structural support.

The use of nonmagnetic lamina to structurally support the stator pole piece laminations of a multipole electromagnet machine is known in the prior art. Also, a motor is known having a permanent magnet rotor with a number of bar-shaped magnets held with one pole against a square portion of the motor shaft, and with the other pole of each magnet held against separate laminated pole pieces, the structural integrity being provided by nonmagnetic coupling rings which circumferentially extend between the separate pole pieces.

The foregoing and other features and advantages of the invention will be apparent from the following more particular description of the preferred embodiments of the invention, as illustrated in the accompanying drawing.

DESCRIPTION OF THE PREFERRED EMBODIMENTS

The present invention will be described in connection with a round and a flat motor having rotary output. However, it is to be understood that the teachings of the present invention equally apply to motors having different shapes and/or linear output, linear output being defined as that type of motion which causes the armature to move along the axis of the motor, rather than to rotate about the axis of the motor.

Figure 1:
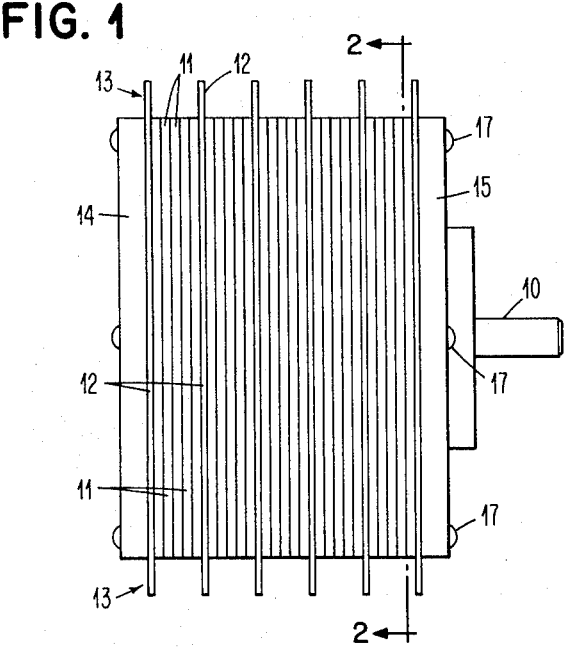
FIG. 1 is the side view of a round motor incorporating the present invention.
Figure 2:
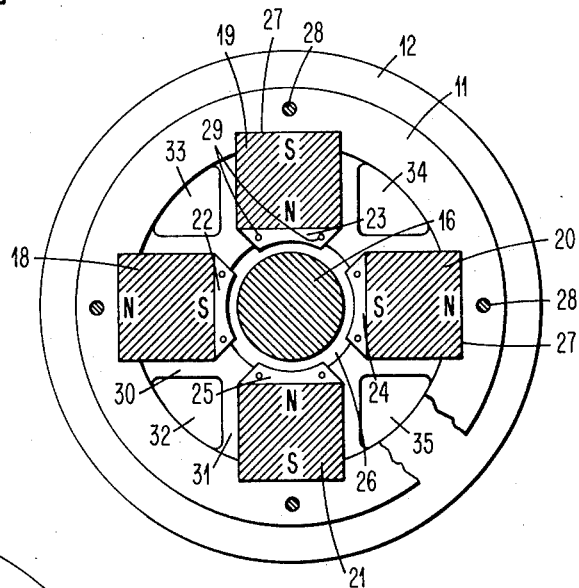
FIG. 2 is a section view of the motor of FIG. 1 taken along the line 2—2, showing one continuous nonmagnetic lamina, four bar-type permanent magnets, and one discontinuous magnetic lamina.

FIG. 1 is a side view of a round, rotary output motor incorporating the present invention. This motor has a generally cylindrical shape and includes an output shaft 10. The main tubular-shaped motor housing is formed by a plurality of individual flux-interconnecting magnetic lamina 11 in the form of rings, as can be seen in FIG. 2. Six of these relatively thick magnetic laminas are contained between relatively thin nonmagnetic lamina 12. By way of example, lamina 11 may be 0.06 inches thick, whereas lamina 12 may be 0.02 inches thick. As can be seen in FIG. 2, nonmagnetic lamina 12 is a continuous lamina having a unique shape, as will be described.

While the motor of FIG. 1 provides a nonmagnetic lamina for every group of six magnetic laminas, the present invention is not to be restricted thereto, but rather, if desired, a nonmagnetic lamina can be positioned between each two adjacent magnetic laminas. Also, as a further feature of the present invention, the nonmagnetic lamina 12 may include projections 13, either continuous or in the form of individual tabs, which extend beyond the boundary of the magnetic lamina to form air cooling fins for the motor.

The outer portion of the motor housing is completed by a pair of nonmagnetic end plates 14 and 15, which may include air flow means for cooling the motor, not shown. For purposes of simplicity, the details of the internal construction of the motor, other than those necessary for a complete understanding of the present invention, will not be described. These details may take many forms, as is apparent to those of ordinary skill in the art. For example, the motor may be of the type which includes a centrally disposed tubular-shaped magnetic flux return path member 16 (FIG. 2), this member being from the center of end plate 14. Member 16 then defines the axis of the motor. The motor armature which rotates about the axis also defined by cantilever supported shaft 10 may be a low inertia hollow tubular armature, for example one which carries a printed circuit armature winding. This tubular armature may be mounted in cantilever fashion by means of a nonmagnetic disk which in turn is mounted on shaft 10, shaft 10 being journaled for rotation at the center of end plate 15.

The various above-named laminas and the motor end plates 14 and 15 are constructed and arranged to form a unitary structure, for example, by bolts or rivets 17 and/or a bonding film of adhesive which is placed between adjacent lamina.

For purposes of simplicity, the motor current supply means or brushes are not shown, the structure of these elements being apparent to those of ordinary skill in the art.

FIG. 2 is a section view of the motor of FIG. 1, showing a continuous nonmagnetic lamina 12, four axially extending permanent magnets 18, 19, 20 and 21, and discontinuous magnetic lamina, this latter lamina including the above-mentioned ring-shaped flux-interconnecting magnetic lamina 11 and four individual focusing magnetic laminas 22, 23, 24 and 25, one of which is associated with each of the permanent magnets and functions to focus the magnetic flux therefrom to define a tubular shaped working air gap 26. This air gap is adapted to receive the above-mentioned hollow tubular armature, not shown.

Magnets 18–21 extend the axial length of the motor, shown in FIG. 1, and are approximately as long as the axial distance between end plates 14 and 15. The focusing magnetic laminas 22–25 extend the axial length of the magnets, there being one focusing lamina in planar coextension or coplanar with each of the flux-interconnecting laminas 12 for the major axial length of the motor, as shown in FIG. 2.

In FIG. 2, a small portion of the ring-shaped flux-interconnecting magnetic lamina 11 is broken away to expose the portion of the adjacent planar coextensive or coplanar nonmagnetic lamina 12 which is substantially coextensive with the magnet laminas.

Within the teachings of the present invention, laminas 11, 12 and 22 through 25 can be formed of metal stampings. Lamina 12 is preferably a material such as aluminum or brass, whereas laminas 11 and 22 through 25 are stamped from a sheet of magnetic metal, for example low carbon steel. Each of the magnetic laminas 11 and the nonmagnetic laminas 12 include four recesses 27 to receive one pole of a magnet, as well as four openings 28 which receive rivets 17 (FIG. 1). These openings also aid in the assembly of the motor, as will be described. Each of the focusing laminas 22 through 25 contains a straight surface which engages the other pole of a magnet and an arcuate surface which focuses the magnetic flux from its magnet to produce a high flux density in working air gap 26, with a minimum amount leakage flux between circumferentially adjacent focusing lamina. Each of the focusing lamina and the nonmagnetic laminas 12 include two openings 29 to facilitate assembly of the motor.

Nonmagnetic lamina 12 is formed to be generally coextensive with the above-mentioned discontinuous magnetic laminas 11 and 22 through 25. Additionally, each nonmagnetic lamina 12 includes web-like arms 30 and 31 which define the cavities into which the magnets are positioned. These web-like arms 30 and 31, in cooperation with the magnets and the magnetic laminas, also define the walls of a plurality of axially extending voids or chambers 32, 33, 34 and 35. These voids facilitate transverse cooling of the tubular armature, as for example, by charging voids 33 and 35 with positive pressure and evacuating voids 32 and 34 by means not shown. This construction causes air to flow from chambers 33 and 35 tangentially across the outer surface of the armature in opposite transverse or tangential directions to voids 32 and 34 where the then heated air is evacuated.

Figure 3:
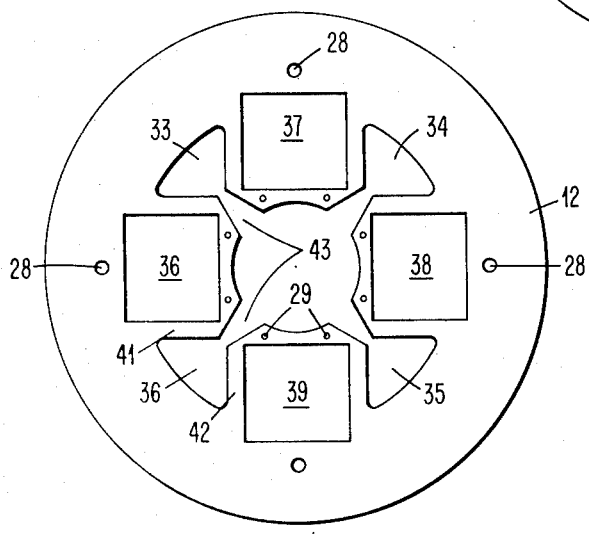
FIG. 3 is another form of nonmagnetic lamina which may be used in the motor of FIGS. 1 and 2.

FIG. 3 discloses another form of nonmagnetic lamina which may be used in the motor of FIGS. 1 and 2 and is particularly adapted to be used where a continuous nonmagnetic lamina is positioned between each discontinuous nonmagnetic lamina. The four cavities 36, 37, 38 and 39 which receive magnets 18, 19, 20 and 21, respectively, are clearly shown. Also, this figure more clearly shows the portion of the nonmagnetic lamina which is coextensive with the focusing magnetic lamina of FIG. 1 and includes the two openings 29 for each of the four individual focusing magnetic laminas. The major difference in the nonmagnetic lamina of FIG. 3 is that the plurality of web-like arms 41 and 42 are not interconnected at the working air gap and thus provide four radial passages 43 which allow voids 33–36 to communicate with the working air gap to thus facilitate the flow of cooling air from chambers 33 and 35 through passages 43 to the air gap and armature, where the air flows tangentially across the armature and enters chambers 34 and 36 through the other two of the passages 43.

The assembly of the motor shown in FIG. 1 is accomplished by means of a fixture, not shown, having upstanding pins which are positioned to cooperate with openings 28 and 29 formed in the various laminas. The laminas are stacked in layers, as desired, with a film of bonding adhesive between each layer. The magnets are pushed into the openings provided therefor. The assembly is now subjected to axial pressure and is cured under a heat environment to assure the intimate bonding and joining of all laminas. Rivets 17 may be used, if desired, to insure structural integrity.

Figure 4:
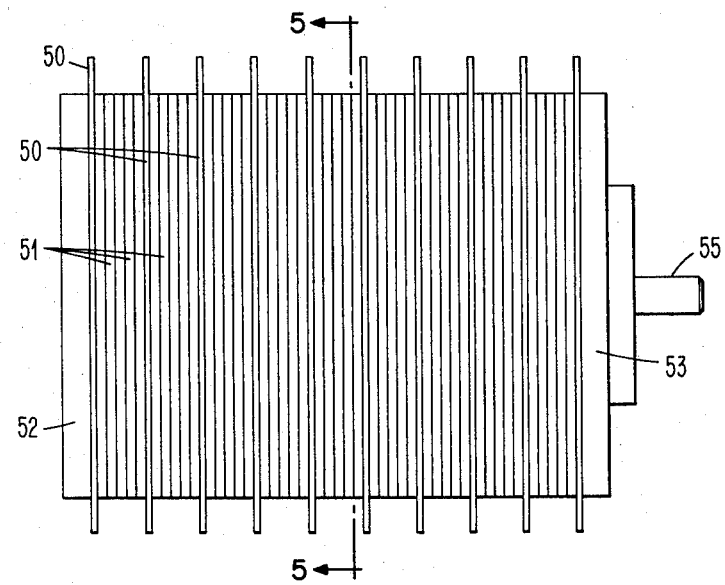
FIG. 4 is a side view of a flat motor incorporating the present invention.

FIG. 4 is a side view of a generally flat shaped motor which incorporates the present invention. Here again, the side view of the motor discloses a plurality of continuous nonmagnetic laminas 50 with a number of individual discontinuous magnetic laminas 51 between each pair of nonmagnetic laminas. As with the motor of FIG. 1, a pair of nonmagnetic end plates 52 and 53 completes the motor housing. The details of the internal construction of the motor of FIG. 4 may again take many forms, as is apparent to those of ordinary skill in the art, for example, end plate 52 may support a tubular-shaped magnetic flux return path member 54 (FIG. 5) which is centrally disposed and defines the axis of the motor. Flux return path member 16, in combination with a number of individual focusing magnetic laminas, defines a working air gap, as will be described.

The armature of the motor of FIG. 4 may be a low inertia tubular armature, for example of the printed circuit type, which is mounted in cantilever fashion on rotary output shaft 55, this shaft being journaled for rotation in end plate 53 and also defining the motor axis.

Figure 5:
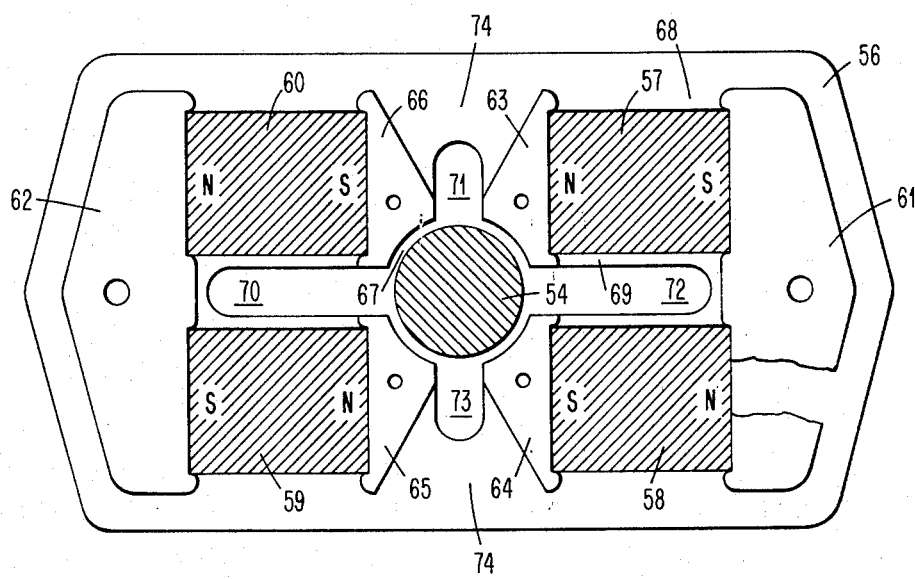
FIG. 5 is a section view of the motor of FIG. 4 taken along the line 5—5, showing one continuous nonmagnetic lamina, four bar-type permanent magnets, and one discontinuous magnetic lamina.

Referring to FIG. 5, this figure is a section view of the motor of FIG. 4 and shows one continuous nonmagnetic lamina 56, four axially extending bar-type permanent magnets 57, 58, 59 and 60 and one discontinuous magnetic lamina which is made up of two flux-interconnecting magnetic lamina members 61 and 62 (identified as 51 in FIG. 4) and four individual focusing magnetic lamina members 63, 64, 65 and 66. One focusing lamina is associated with each of the four permanent magnets and functions to focus the magnetic flux therefrom to a tubular shaped working air gap 67 which is adapted to receive the tubular armature, now shown. Magnets 57 through 60 extend substantially the complete length of the motor and may be, if desired, approximately as long as the distance between end plates 52 and 53. As with the motor of FIG. 1, the focusing laminas are stacked to cover the major axial length of each of the magnets, the focusing laminas being planar coextensive with the flux-interconnecting laminas, as shown in FIG. 5.

Flux-interconnecting magnetic lamina 61 is broken away to expose the underlying continuous nonmagnetic lamina 56 which is substantially coextensive with the discontinuous magnetic lamina. As can be seen in FIG. 5, nonmagnetic lamina 56 includes arms 68 and 69 which define four cavities to receive and hold the four magnets. Lamina 56 also includes web portions 74 which structurally support the magnetic couple 57–58 relative to the magnetic couple 59–60. Here again, the nonmagnetic and the magnetic laminas include openings to facilitate assembly. These openings also can be used to receive rivets to insure structural integrity as by the use of both the rivets and interlamina adhesive, as above described in relation to the motor of FIG. 1.

Nonmagnetic lamina 56 is constructed and arranged to define four voids or passages 70, 71, 72 and 73. Passages 70 and 72 are adapted to be connected to a source of positive pressure, to facilitate cooling of the armature as above described in relation to the motor of FIG. 1.

The above description of preferred embodiments of the present invention make it readily apparent that, in accordance with the present invention, a group of individual focusing magnetic laminas are associated with each of the magnets; for example, the group formed by individual laminas 22 (FIG. 2) which axially extends along the south magnetic pole of magnet 18 of the motor of FIG. 1; or the group formed by the individual laminas 63 (FIG. 5) which axially extends along the north magnetic pole of magnet 57 of the motor of FIG. 4. Also, a group of individual flux-interconnecting magnetic laminas are associated with each magnetic couple to complete a low reluctance magnetic flux path between adjacent magnets; for example, the group formed by individual magnetic laminas 12 which axially extends along the outer magnetic poles of magnets 18 through 21 of the motor of FIG. 1, or the group formed by individual magnetic laminas 61 and/or 62 which axially extends along the outer magnetic poles of the magnetic couples 57–58 and/or 59–60 of the motor of FIG. 4.

In both the motor of FIG. 1 and the motor of FIG. 4 a plurality of individual nonmagnetic laminas are positioned to extend between corresponding, or perhaps all, of the planar coextensive laminas of the flux-interconnecting and focusing groups.

While the invention has been particularly shown and described with reference to preferred embodiments thereof, it will be understood by those skilled in the art that various changes in form and details may be made therein without departing from the spirit and scope of the invention.

What is claimed is:

1. In a permanent magnet dynamoelectric machine having an armature which moves relative to an axis, and having means establishing at least one magnetic couple relative to said axis, the improvement comprising:
    at least two axially extending permanent magnets,
    at least two groups of individual focusing magnetic laminas, one group being associated with each of said permanent magnets to focus the magnetic flux therefrom to a working air gap for the armature,
    at least one group of individual flux-interconnecting magnetic laminas associated with said permanent magnets to complete a low reluctance magnetic flux path between said magnets, and
    a plurality of individual nonmagnetic laminas positioned to extend between at least certain planar coextensive laminas of said focusing magnetic laminas and said flux-interconnecting magnetic laminas,
    and means including said nonmagnetic laminas defining at least two cavities to receive and hold said permanent magnets in operative relation to said magnetic laminas.

2. A permanent magnet machine as defined in claim 1 wherein said nonmagnetic laminas extend beyond the boundary of at least said flux-interconnecting magnetic laminas to form air cooling fins.

3. A rotary permanent magnet machine as defined in claim 1 wherein said magnets are positioned in said cavities to produce series-aiding magnetic flux at said air gap.

4. A permanent magnet machine as defined in claim 1 wherein each of said focusing magnetic laminas and said flux-interconnecting magnetic laminas are separated from the adjacent magnetic lamina by a nonmagnetic lamina.

5. A permanent magnet machine as defined in claim 4 wherein said magnetic lamina and said nonmagnetic lamina are formed in alternating layers of discontinuous magnetic-metal stampings and continuous nonmagnetic-metal stampings, respectively.

6. A permanent magnet machine as defined in claim 5 wherein adjacent layers of said stampings are secured one to the other by an adhesive.

7. A round permanent magnet machine as defined in claim 1 wherein an even number of permanent magnets are circumferentially spaced about a centrally disposed tubular-shaped magnetic flux return path member, the annular space between said focusing magnetic laminas and said flux return path member defining said working air gap, and wherein said flux-interconnecting magnetic laminas take the form of a plurality of ring lamina encircling said magnets.

8. A rotary permanent magnet machine as defined in claim 7 wherein said permanent magnets circumferentially alternate in magnetic polarity about said air gap.

9. A round permanent magnet machine as defined in claim 7 wherein each coplanar layer of said magnetic lamina is formed of discontinuous magnetic-metal stampings, said flux-interconnecting laminas taking the form of rings, and said focusing magnetic lamina taking the form of individual stampings for each of said magnets; and wherein each coplanar layer of said nonmagnetic lamina is formed of a continuous nonmagnetic metal stamping having a plurality of individual cavities to receive said magnets and having portions generally coextensive with said magnetic lamina.

10. A round permanent magnet machine as defined in claim 9 having alternating coplanar layers of magnetic and nonmagnetic lamina to thus form a motor housing, and wherein said nonmagnetic lamina is additionally formed to provide an axially extending internal void between circumferentially adjacent magnets, said voids facilitating the flow of a cooling medium through the machine.

11. A round permanent magnet machine as defined in claim 10 wherein at least certain of said nonmagnetic laminas radially extend beyond said ring-shaped flux-interconnecting laminas to form cooling fins.

12. A flat permanent magnet machine as defined in claim 1 wherein an even number of permanent magnets are positioned in general alignment on opposite sides of said axis; wherein each of said magnets is associated with focusing magnetic laminas shaped to focus the magnetic flux therefrom to a centrally disposed tubular-shaped magnetic flux return path member, the resulting annular space between said focusing magnetic laminas and said flux return path member defining said air gap; and wherein said flux-interconnecting magnetic laminas take the form of at least two groups of laminas, one of which is associated with the magnets on one side of said axis and the other of which is associated with the magnets on the other side of said axis.

13. A flat permanent magnet machine as defined in claim 12 wherein each coplanar layer of said magnetic lamina is formed of discontinuous magnetic-metal stampings, and wherein each coplanar layer of said nonmagnetic lamina is formed of a continuous nonmagnetic-metal stamping having individual cavities to receive said magnets and having portions which are generally coextensive with said magnetic lamina, said nonmagnetic laminas extend between said magnetic laminas to structurally support said magnetic laminas in cooperative relation to said magnets and said air gap.

14. A flat permanent magnet machine as defined in claim 13 wherein said machine is formed of alternate coplanar layers of magnetic lamina and nonmagnetic lamina.

* * * * *